Oct. 16, 1962 J. COURTIN 3,058,461
MASSAGING INSTALLATION AND CONTROL APPARATUS THEREFOR
Filed May 23, 1958 4 Sheets-Sheet 1

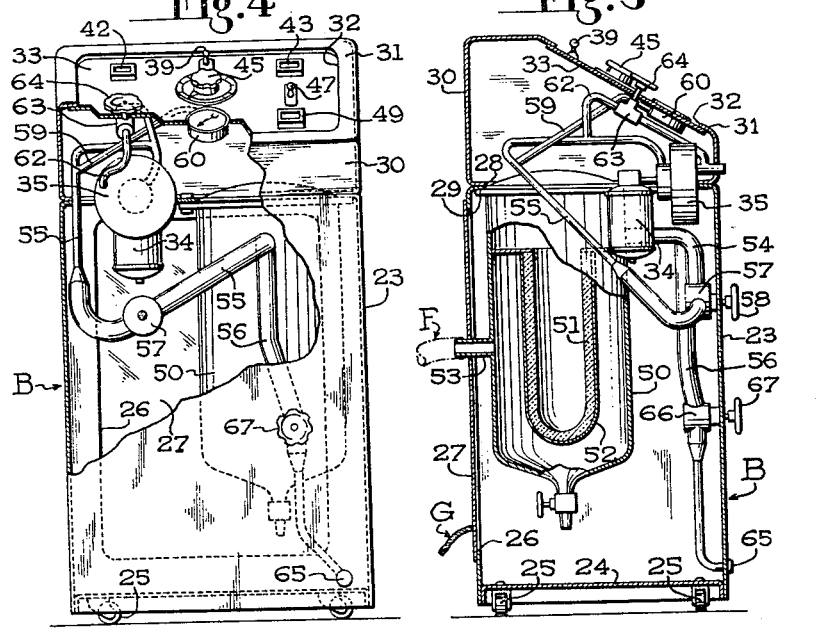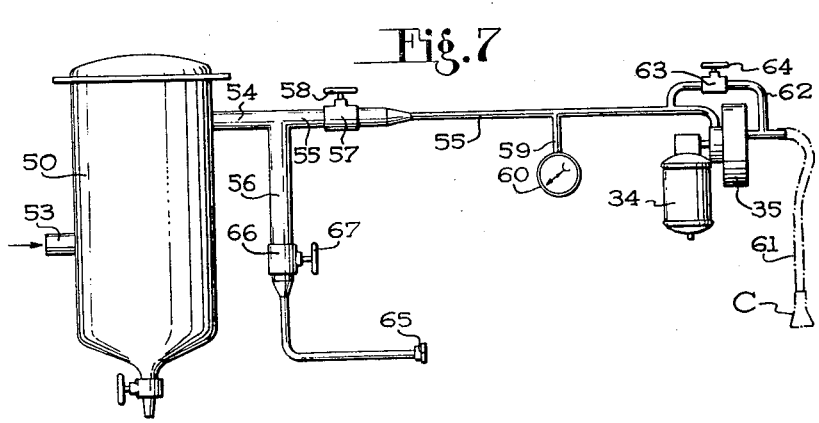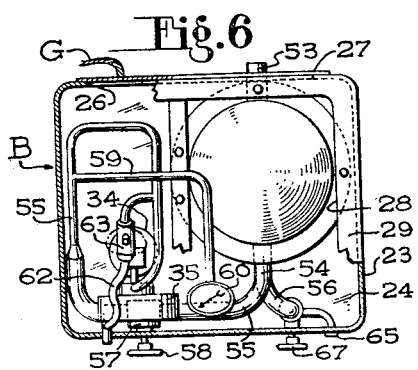

United States Patent Office 3,058,461
Patented Oct. 16, 1962

3,058,461
MASSAGING INSTALLATION AND CONTROL
APPARATUS THEREFOR
Jacques Courtin, 7 Rue Guenegaud, Paris, France
Filed May 23, 1958, Ser. No. 737,281
Claims priority, application France May 24, 1957
4 Claims. (Cl. 128—38)

The present application is a further continuation in part of applicant's U.S. patent applications No. 627,886 filed December 12, 1956, now Patent No. 2,962,022, and No. 716,234 filed February 19, 1958.

The present invention described in this application relates to massaging installation utilizing a flow of compressed air directed on to the body of the person to be massaged through a narrow slot of a blower nozzle.

The invention implements the system and methods described in said patent application with specific means for carrying out said methods under optimum conditions of operation designed to obtain maximum massaging effect with high efficiency.

Heretofore, air massaging has been attempted with a flow of air at high pressure and low volume per second by using equipment comprising an air reservoir and means for heating the air supply from said reservoir.

While an air reservoir could be of use in distributing the flow of air to a variety of nozzles fed from a single air compressor, it would be in this preferred form of the invention only incidental or secondary to the primary purpose of the invention, which is to utilize the air flow as directly as possible as it issues from the compressor with all its dynamic energy.

The volume air massage method described in said patent applications is best obtained through specific means for the supply of compressed air to the nozzle and departure from said means impairs the results of the air massage treatment to a point where its desirability becomes questionable.

A further feature of the invention is to separate the compressor proper from the air filtering and pulsating means which must be located in the immediate vicinity of the massage table or bed.

Owing to the great volume of air flowing over the body, it must not be used repeatedly as this air has a tendency to become stale and moist with water, salt and fat particles removed from said body and too warm for the results desired from the massaging operation.

Another object of the invention is to separate the compressor proper from the pulsating and control devices and to provide fresh air together with means for cooling said air after compression to a constant temperature appropriate for the required type of massage.

Another object of the invention is to provide means for cooling said air after compression together with filtering and condensing means so that any moisture or any oil vapour is condensed and separated from the air supply before it reaches the nozzle.

Another object of the invention is to provide safe, low voltage electrical means mounted on the control box, on the massage table or on the nozzle to control the compressor at a distance in accordance with the requirements of the treatment or of a plurality of air discharge nozzles, as the case may be.

In certain large installations and notably in certain hospitals or other premises having a general compressed air supply, the latter could be distant from the massage cubicle and the nozzles could be connected to a pipe line supplying the air to this cubicle. In the case of small premises devoid of a general compressed air supply, it is necessary to provide motor-compressor unit specially adapted to feed the massage nozzles.

Heretofore, the motor-compressor unit has been provided in the immediate vicinity of the massage table in the massage cubicle, with consequent disadvantages. The motor-compressor unit is noisy and could inconvenience the patient; it discharges in a substantially closed circuit the air drawn in from the inside of the cubicle or other massage room and no renewal of the air occurs; it requires the presence of high power electric current in the massage cubicle and therefore safety measures are necessary; it is relatively large and consumes space in the cubicle; and it is necessary to provide a motor-compressor unit for each cubicle.

These disadvantages are avoided in the installation of the invention.

An object of the invention is to provide a massaging installation utilizing a flow of compressed air, characterized in that it comprises a motor-compressor unit, located outside the massage cubicle or cubicles and connected to the blower nozzle of the or each cubicle through the medium of control apparatus disposed in the cubicle, the motor-compressor unit and the control apparatus being interconnected by a preferably flexible pipe supplying the compressed air from the compressor to the apparatus and by an electric cable carrying solely low tension current and permitting controlling and checking the operation of the motor-compressor unit by means of the control apparatus.

Owing to this separation of the motor-compressor unit and the control apparatus or apparatuses, it is possible, on the one hand, to separate the place of production of compressed air from the places of consumption of the latter, which permits avoiding the various aforementioned disadvantages as will be explained hereinafter, and, on the other hand, to centralize at the control apparatus—which is always within reach of the masseur and easy to move—the various controls for carrying out the massage, thereby facilitating the latter, and controlling the motor-compressor unit.

Another object of the invention is to provide a control and checking apparatus for the aforementioned installation. Said apparatus, which is simple in construction, easily moved, small in size and particularly convenient to use, is characterized in that it comprises a support containing various accessories adapted to be interposed between the compressed air supply pipe and the blower nozzle which is connected to said support, and the latter carries a control panel on which are grouped the various control and checking devices.

Further features and advantages of the invention will be apparent from the ensuing description, with reference to the accompanying drawings, to which the invention is in no way restricted.

In the drawings:

FIG. 4 is a front elevational view of said control apparatus with a part cut away;

FIG. 5 is a side elevational view of said control apparatus, the side walls of the housing and desk having been removed;

FIG. 6 is a plan view of the lower part of the control apparatus, the desk having been removed;

FIG. 7 is a developed diagram of the circuit provided in the control apparatus between the compressed air supply and the pipe connected to the massage nozzle;

The installation of the invention is provided for the application of the massaging methods utilizing a flow of compressed air and notably pulsating air described in said U.S. patent applications.

Figure 1:
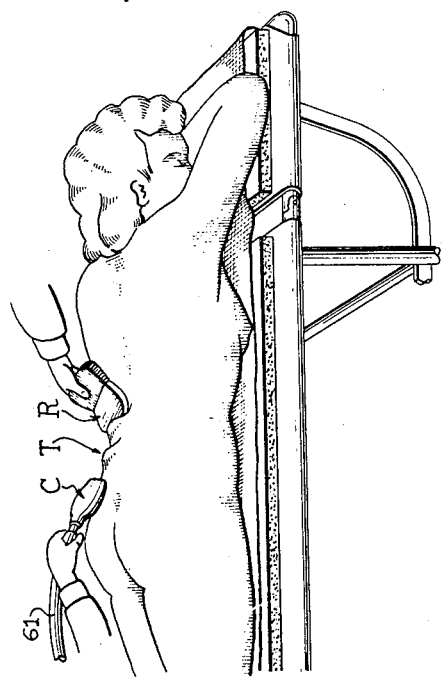
FIG. 1 is a perspective view of the application of the installation of the invention.

In this application of said massaging methods the patient (FIG. 1) is laid in a horizontal relaxed position and is subjected to the impact of a flow or a jet of compressed air or pulsating flow of air issuing from a nozzle or blower C fed by a pipe 61 so as to create in the tissues of the body of the patient formation of mobile waves T which can be blocked by a scraper R or other means as described in said U.S. patent application 627,886.

In the example shown in the figures, the massage installation of the invention comprises (FIG. 2) a motor-compressor unit A disposed in a room or compartment I, there being disposed in the cubicle or other massage room II a control and checking apparatus B which interconnects the motor-compressor unit A and the blower nozzle C. The latter is adapted to direct onto the patient lying on a table D a flow of pulsating compressed massaging air.

The motor-compressor unit A is supplied with electric power current by a cable E and is connected to the control apparatus B, on the one hand, by a flexible pipe F through which flows the compressed air from the unit A to the apparatus B and, on the other hand, by an electric cable G permitting a control and checking at low tension of the unit A by the apparatus B.

The unit A has not been shown in detail as it is of conventional type. It comprises a housing 1 (FIG. 2) containing an electric motor 2 (FIG. 8) whose output shaft 3 is connected to the compressor 4. The latter draws in air from the exterior through an opening, such as aperture 5 (FIG. 2) and discharges this air at suitably low pressure (for example about 1.2–6 kg./sq. cm.) and comprised preferably between 1.2–2.5 kg./sq. cm., through the flexible pipe F.

Figure 2:
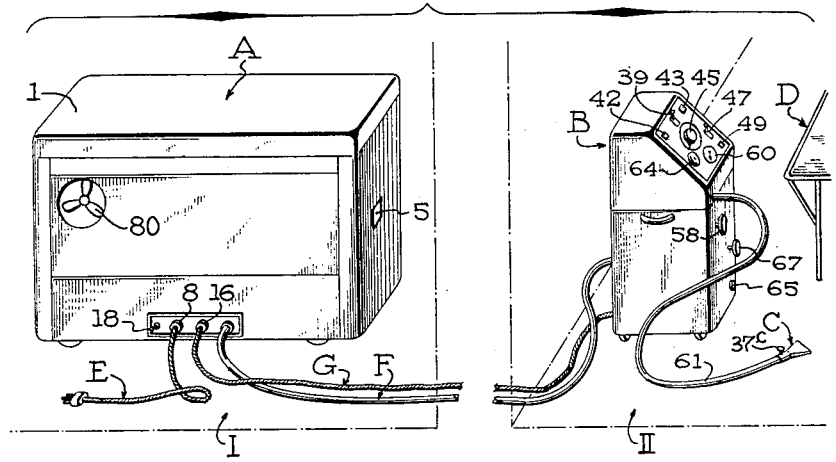
FIG. 2 is a perspective diagrammatic view of an installation embodying the invention for use in respect of a single massage cubicle.

The motor 2 is supplied with power by the cable E which comprises, in the case of three-phase current the three conductors 6 and a grounding conductor 7. This cable E is connected to the motor compressor A by a four-pin plug 8 (FIG. 2).

The three pins corresponding to the three-phase current are connected to the three terminals of the motor by conductors 9 through a cut-out switch 10 controlled by a coil 11. The latter is fed with current by the secondary winding 12 of a transformer 13 whose primary winding 14 is connected by two conductors 15 to two of the conductors 9 of the main supply circuit of the motor at points located between the switch 10 and the plug 8.

The winding 11 and the secondary winding 12 are series connected in a main control circuit connected to the terminals $b$ and $c$ of a five-pin power supply plug 16 (FIG. 2) which is at the end of the cable G connecting the unit A to the apparatus B. A manostat 17 is disposed in the main circuit inside the unit A and is adapted to open this circuit when the pressure of compressed air supplied by the compressor 4 reaches a given maximum. Further, there is provided, for example, adjacent the plug 8, the control lever 18 of a switch 19 (FIG. 8) permitting interconnecting the terminals $b$ and $c$ for trying out or checking the motor-compressor unit A. It can be seen that, as the supply cable E is connected by its plug 8 to the unit A, current is fed to the primary 14 of the transformer 13, so that the secondary 12 feeds the coil 11 as soon as the switch 19 is closed. Thus it is possible to verify correct operation of the unit A from the room I.

It will be understood that in normal operation the switch 19 is left open and the compressor control is insured by means of the apparatus B.

With regard to the motor-compressor unit A, the terminals $d$ and $e$ are connected by conductors 20 to the ends of the secondary 12 and terminal $a$ is connected to the frame 21 of the unit A and, by way of a conductor 22, to the terminal of the plug 8 which permits connecting this conductor to ground.

Description will now be given of the control apparatus B as concerns in succession, the general arrangement, the electric apparatus and its connections to the unit A and, lastly, the details of the various devices through which compressed air passes or is capable of passing.

This apparatus B is in the form of a movable support or unit. It comprises a housing 23 (FIGS. 4 to 6) of parallelepipedic shape, formed by suitably folded sheet metal which is welded and/or fastened and provided with a base 24 mounted on castors 25 which permit moving the apparatus. The housing 23 is provided in its rear wall with a large opening 26 closed by an attached closing panel 27. The upper face of the housing is open at 28 and consists of a flange 29 on which is secured a desk body 30. The face 31 of this desk is upwardly inclined toward the rear of the apparatus and comprises a large window 32 behind which is fixed an insulating panel 33. The latter is adapted to support the various electromechanical control and checking devices of, on the one hand, the motor 2 of the motor-compressor unit A, and, on the other hand, an accessory motor 34 located in the housing 23 and adapted to drive the rotative element of a pulsating device 35 which converts the compressed air at constant pressure supplied by the compressor into pulsating air facilitating the massage.

As concerns the electromechanical elements, the desk is arranged in the following manner (FIGS. 3, 4, 5 and 8). Terminals $a^1$, $b^1$, $c^1$, $d^1$, $e^1$ are provided on the lower face of the panel 33 and are connected by the conductors of the cable G and the pins of the plug 16 to the terminals $a$, $b$, $c$, $d$, $e$ respectively.

The terminal $a^1$ is connected at 36 to the frame of the apparatus B.

Figure 3:
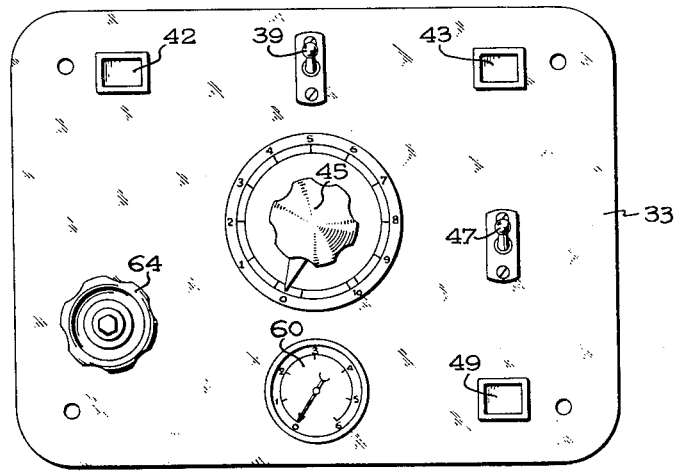
FIG. 3 is a view of the desk of the control apparatus.

The terminals $b^1$ and $c^1$ are connected by conductors 37 to a control switch 38 actuated by a lever 39 disposed on the upper face of the panel 33 (FIGS. 3, 4 and 5). When the switch 38 is closed, the circuit of the coil 11 and secondary 12 of the transformer 13 is closed. This starts up the motor-compressor 2—4 on condition that the plug 8 of the supply cable E has been previously connected.

Preferably, another switch is provided at 37$^b$ (FIG. 8), which can be controlled by means of a control button 37$^c$ (FIG. 2) arranged on the nozzle C.

Disposed on either side of the switch 38 are two lamps 40 and 41 which illuminate two indicators or signals 42 and 43. The lamp 40 is connected to the terminals $b^1$ and $d^1$, namely to the terminals $b$ and $d$ of the motor-compressor unit A, that is, to the ends of the coil 11. Thus the lamp 40 it lit and the indicator 42 illuminated when the coil is excited, that is, when the motor-compressor unit operates normally, the switch 38 being closed.

The lamp 41 is connected to the terminals $d^1$ and $e^1$, and in consequence connected to the ends of the secondary 12, by the terminals $d$ and $e$. Thus this lamp is lit and the indicator 43 illuminated as soon as the cable E is connected by the plug 8 to the motor-compressor unit A. This indicator therefore permits ascertaining whether the unit A is capable of operating as soon as the switch 38 is closed, this closing being possible from the massaging cubicle.

The table 33 carries on its lower face a rheostat 44 controlled by a lever 47 and a lamp 48 adapted to illuminate an indicator or signal 49. The motor 34 is connected through the rheostat 44 and the switch 46, which are series connected, to the terminal $d^1$ and $e^1$, and, through the cable G, to the ends of the secondary 12 of the transformer 13, so that the motor 34 is supplied with power when the transformer 13 carries current as soon as the switch 46 is closed. Operation or non-operation of this motor is indicated by the indicator 49 which is illuminated by the lamp 48 when the motor carries current.

As concerns the circuits of compressed air, the control apparatus B is arranged in the following manner (see FIGS. 4 to 7).

Fixed inside the housing 23 is the body 50 of a porcelain oil-removing filter 51 and felt 52 which retains the last traces of oil and water in suspension in the compressed air supplied through the pipe F connected to a rear pipe connection 53 carried by the filter body 50. A lower drain plug permits discharge of the traces of the retained oil and water.

The filtered compressed air issues from the upper part of the body through a pipe 54 which is divided into two branch pipes 55 and 56.

Disposed on the main branch pipe 55 is an adjustable valve 57 which can be operated by means of a control knob 58 disposed on the front face of the apparatus. On the down stream side of the valve 57, with respect to the air flow, there is connected a branch pipe 59 leading to a pressure gauge 60 carried by the panel 33, the dial of this gauge being disposed on the upper face of this panel. On the downstream side of the pipe 59, the pipe 55 is connected to an air pulsating device 35 whose moving element is driven by the motor 34. This pulsating device could be notably any one of the embodiments thereof described in said U.S. patent application No. 716,234.

A flexible pipe 61 which terminates in a blower nozzle C (FIG. 2) is connected to the output end of the pulsating device 35. It will be observed that the input and output ends of the pulsating device 35 can be by-passed by a pipe 62 provided with a regulating valve 63 carried by the panel 33 and actuated by a knob or wheel 64 disposed on the upper face of said panel.

The pipe 56 is connected to a compressed air supply 65 provided at the lower part of the front face of the apparatus B, the flow of air through this supply 65 being regulated by a valve 66 controlled by a control member 67 disposed on the front face of the apparatus B. This air supply feeds any accessory apparatus.

The installation operates in the following manner:

Briefly, to use the installation, the cables E and G are connected to the motor-compressor unit A by the plugs 8 and 16. The lamp 41 connected to the ends of the secondary winding 12 of the transformer 13 indicates in the massage cubicle II that these connections have in fact been obtained.

To start up the motor-compressor unit A, the switch 38 is closed and operation of the unit is indicated by illumination of the lamp 40. The motor of the pulsating device 34 is in turn started up by closing the switch 46 and the frequency of the pulsations is regulated by the rheostat 44. By operating the various valves 57, 63 and 66 there is obtained in the blower nozzle C and/or in the supply 65 respectively pulsating air and compressed air at the desired pressures regulatable by said valves.

The installation has very many advantages which were outlined in the introduction and which will now be considered in detail.

The apparatus B permits centralizing in a single unit, which is very mobile and always within reach of the masseur, the various controls required for effecting the massage and the latter is greatly facilitated thereby.

Further, the fact that the motor-compressor unit A and the apparatus B can be interconnected at any distance, depending solely on the length of the cable G and the pipe F, it is possible to separate the production of compressed air from the consumption of the latter, which affords the following advantages:

(a) The noise from the motor-compressor unit is at a distance from the massage cubicle and, if desired, from any room in the vicinity of this cubicle, for example a reception room.

(b) The treatment is carried out with continuously renewed air, contrary to what occurs when the compressor located in the massage cubicle draws in and discharges the air in a substantially closed circuit; thus the air drawn in by the compressor is cleaner and cooler (when the treatment room or cubicle is heated) which results in higher efficiency of the motor-compressor unit.

(c) It is possible to much more effectively cool the compressed air, which permits an improved dehydration and a good purification of the compressed air owing to the temperature drop obtained in the pipes.

(d) The remote control of the motor-compressor unit avoids the necessity of locating the power supply current required for driving the unit A in the massage cubicle and thus avoids the dangers of such a current and dispenses with the necessary safety precautions; the motor-compressor unit is controlled by the apparatus A at low tension (the power supplied by the secondary winding 12 of the transformer 13), this low tension being, for example, between 12 and 24 volts.

(f) Separation of the unit A and apparatus B enables a smaller treatment cubicle to be provided, which is easier to insulate as concerns sound and is cheaper to construct.

(g) This separation also permits a universal use of the motor-compressor unit. If the treatment cubicle is located on an upper floor, the stairs leading thereto could be too narrow for carrying up the motor-compressor unit, the latter being heavy and bulky owing to the required air flow and pressure. It is possible to install the motor-compressor unit of the installation of the invention on the ground floor or in the basement and to control it by means of the cable G.

(h) The pulsating device 35 may be disposed close to the blower nozzle C which provides better air vibration without damping effect.

In the foregoing example the motor-compressor unit A is combined with a single control and checking apparatus B, that is, this unit supplies only one massage cubicle or premises. However, it will be understood that the same unit A, provided that the compressor 4 has a sufficient output, could be utilized for feeding in parallel a plurality of massage cubicles through the medium of a number of apparatus B, $B_1$ . . . (FIG. 8) corresponding to the number of cubicles. These apparatus are connected in parallel to the pipe F and to the cable G without any other modification.

Figures 8, 9:
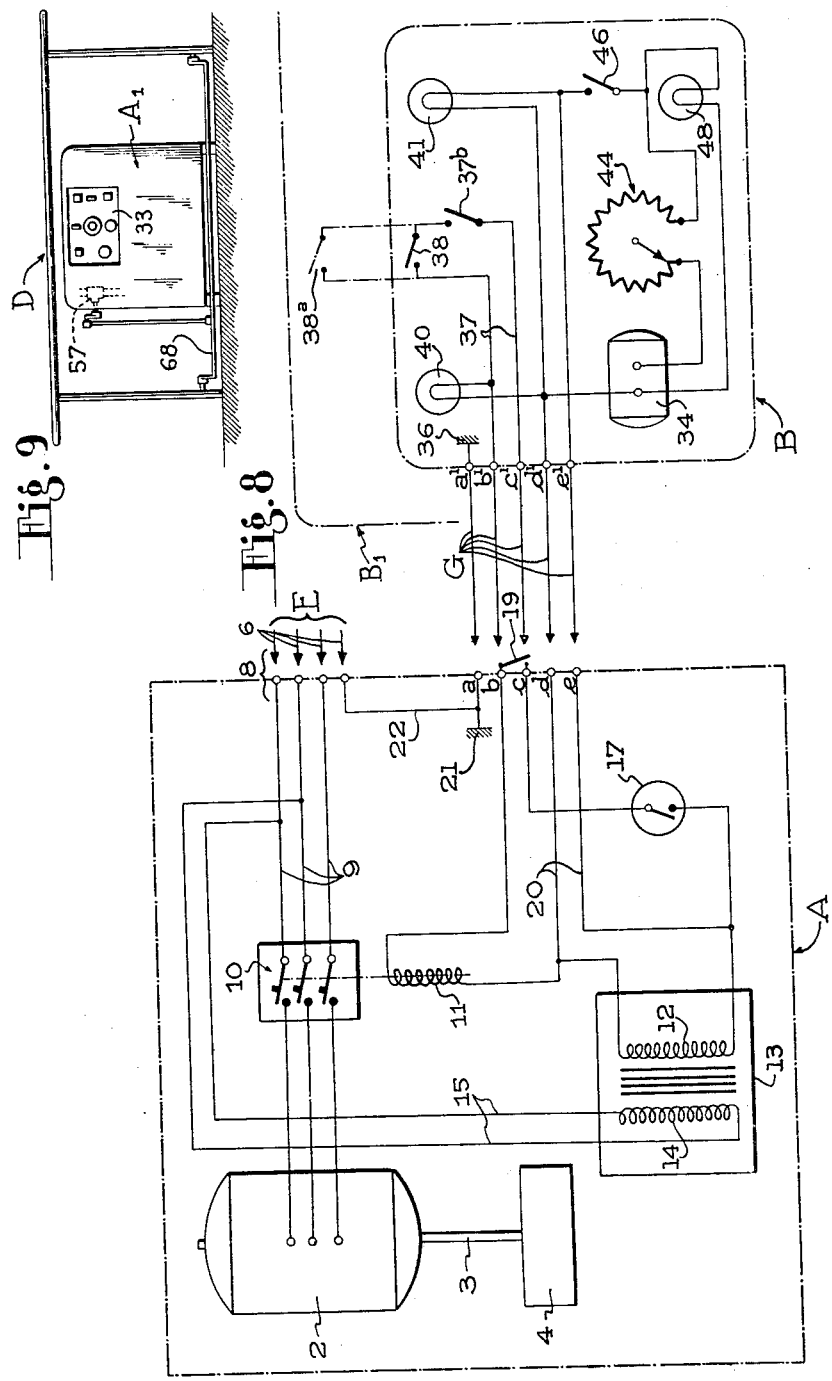
FIG. 8 is a diagram of the electric connections of the installation of the invention.
FIG. 9 is a side elevational view of a modification of the control apparatus located under the massage table.

Thus there has been shown in the FIG. 8 at $38^a$ the control switch pertaining to a second apparatus $B_1$. To avoid unnecessary complication of the drawing, the switch $38^a$ has been shunt connected directly to the switch 38, but in practice it would be shunt connected to the cable G between the terminals $b$—$b^1$ on the one hand and $c$—$c^1$ on the other.

It will be immediately clear that the control of the motor-compressor unit A presents no difficulty. The latter is started from any one of the massage cubicles, the first masseur to use the installation starting up the motor-compressor unit, which stops only when all the switches 38, $38^a$ . . . have been opened. Thus the last masseur to use the insulation is able to obtain compressed air and it is he who stops the motor-compressor unit by opening his switch.

FIG. 9 shows a modification $B_1$ of the control apparatus which is adapted to be placed under the massage table D. In this case the table 33 constitutes all or part of the front face of the apparatus and the valve 57, instead of being controlled by the wheel 58 of the preceding example, is controlled by a pedal 68.

Figure 10:
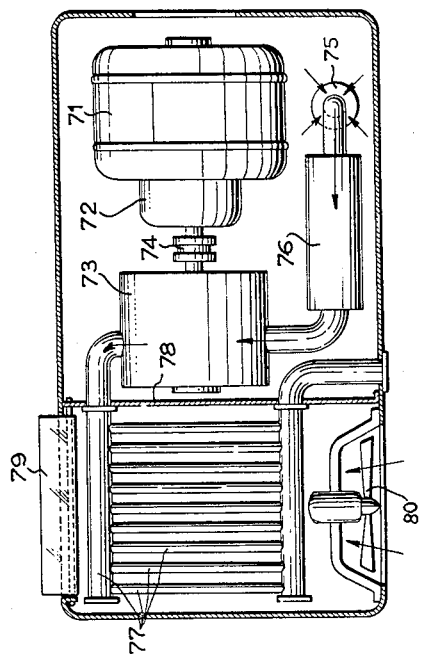
FIG. 10 is a plan view of a preferred air supply system especially adapted to carry out the invention.

The air supply system shown in FIG. 10 comprises in the preferred form of the invention an electric motor 71 having speed reducing gear 72 which drives an air compressor 73 through a silent coupling 74. The air intake is provided with a filter 75 and a silencer 76. The compressed air flows through a heat exchanger 77 located in a compartment partitioned off from the compressor by a wall 78.

The air is piped from the heat exchanger to the control apparatus B. The heat exchanger is enclosed in a compartment closed on one side by louvres or flaps 79 which may be opened to a variable extent to establish a variable degree of air circulation, thus permitting evacuation of heat from the enclosure. However, when the unit is in continuous use, it is preferred to circulate the compressor cooling air by means of an electric fan 80 whose speed is variable. The electric fan may be controlled from the control panel or from any convenient point.

The means for cooling the massage air at the outlet of the compressor are not limited to a circulation of air. A cooling system using water as a medium for heat exchange or a refrigerating system may be substituted for the air fan, if needed, in warm locations or for tonic treatments requiring a temperature drop.

Although specific examples of the invention have been described, many modifications and changes may be made therein without departing from the scope of the invention as defined in the appended claims.

Having now described my invention what I claim as new and desire to secure by Letters Patent is:

1. Air massage apparatus comprising a high volume, low pressure air compressor unit constructed to produce air flow at volumes within the high volume low pressure zone for effective air massage by the production of deep travelling ridges in the skin and flesh of a patient under treatment, a control and application unit remote from said compressor unit, power means supplying electrical power to said compressor unit for operation of the latter, first connecting means coupling said units for the transfer of compressed air from said compressor unit to said control and application unit, and second connecting means coupling said units for controlling the operation of said compressor unit from said control and application unit, said control and application unit including means for applying the compressed air to a patient in high volume at low pressure at a small angle to the surface of the body of a patient, the volume, pressure and direction of air flow from said application unit having related values such that they produce deep travelling ridges in the skin and flesh of the body of a patient being treated, said deep travelling ridges being produced whether the application unit remains in a stationary position or is moved slowly over the body of the patient.

2. Apparatus as claimed in claim 1 comprising means in said control and application unit for receiving the compressed air and rendering flow of the same pulsatile.

3. Apparatus as claimed in claim 1 comprising means in said compressor unit for controllably cooling the compressed air.

4. Apparatus as claimed in claim 1 comprising means in the control and application unit for filtering the compressed air.

References Cited in the file of this patent

UNITED STATES PATENTS

| 20,896 | Rose | July 13, 1858 |
| 881,321 | Kellogg | Mar. 10, 1908 |
| 2,234,101 | Andres | Mar. 4, 1941 |
| 2,717,604 | Mastaller | Sept. 13, 1955 |